April 22, 1969    S. M. MEITINGER    3,439,383
APPARATUS FOR MAKING ORNAMENTED TAPE PRODUCT
Filed March 21, 1966

INVENTOR.
SYLVESTER M. MEITINGER
BY
ATTORNEY

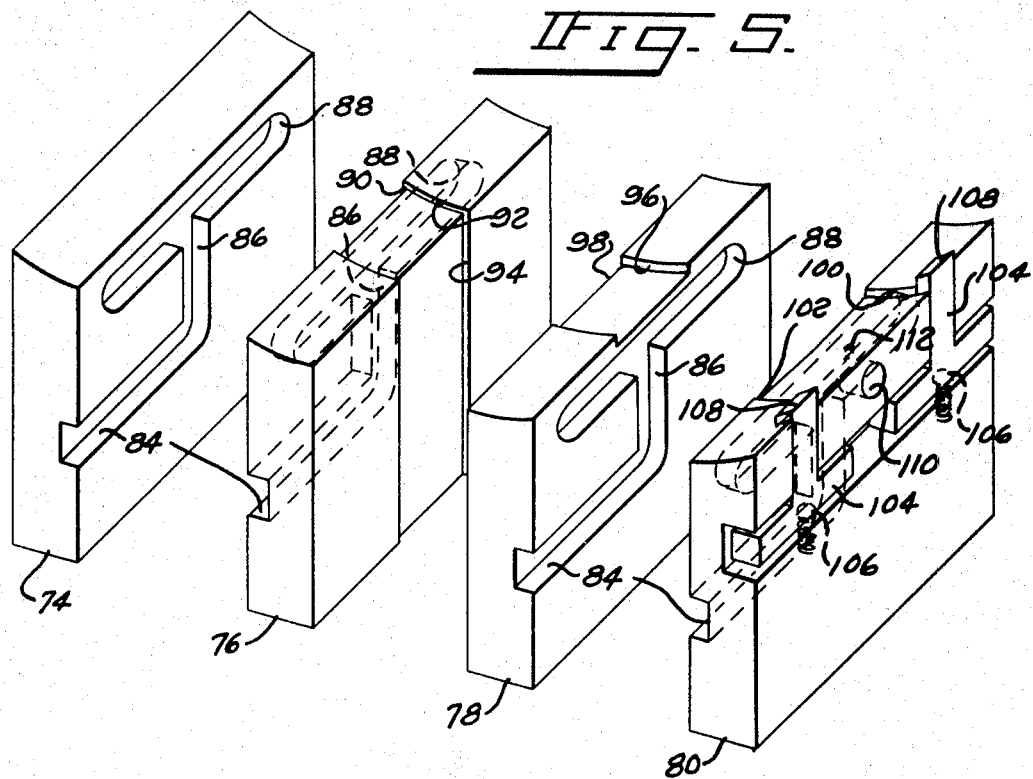
Fig. 5.
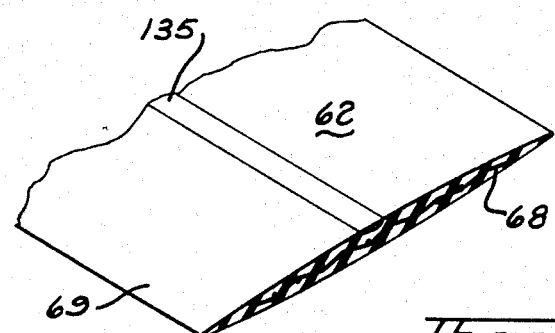
Fig. 6.
INVENTOR.
SYLVESTER M. MEITINGER
BY
ATTORNEY

United States Patent Office 3,439,383
Patented Apr. 22, 1969

3,439,383
APPARATUS FOR MAKING ORNAMENTED TAPE PRODUCT
Sylvester Martin Meitinger, Toledo, Ohio, assignor to Stauffer Chemical Company, New York, N.Y., a corporation of Delaware
Filed Mar. 21, 1966, Ser. No. 536,161
Int. Cl. B28d 3/02; B29f 3/012, 3/10
U.S. Cl. 18—13                                2 Claims

ABSTRACT OF THE DISCLOSURE

Extrusion apparatus of the type adapted to the fabrication of a plastic coated web material, the apparatus being characterized in that means are provided for applying a distinguishing mark to at least one surface of the coated web.

---

This invention relates to the manufacture of ornamented tape products, particularly plastic tape, both reinforced and non-reinforced, and in its most specific aspect concerns improvements in the inventions described in co-pending application Ser. No. 449,386 filed Apr. 13, 1965 now U.S. Patent 3,253,073 in the name of Max Skobel.

The improvements herein are adapted for application to any tape-making system utilizing the extrusion principle, whether the product tape is stretchable or non-stretchable, i.e. whether the product is formed from an elastomeric or non-elastomeric, e.g. resinous, material.

In accordance with the invention there is applied to the tape product a distinctive mark or indicia which may take various forms and which may be utilitarian or merely decorative. Thus, in one embodiment the invention is utilized to apply to the tape a center line assisting in wrapping of the tape, with proper overlap, about an electric cable, for example. In another embodiment, the invention is applied to provide a mark indicating the source of origin of the tape, i.e. a trademark. In still another embodiment, a plurality of lines extending the length of the tape are applied in different colors for ornamental purposes.

A principal object of the invention is to provide apparatus for accomplishing the foregoing at minimal cost.

Another object is to provide means whereby the indicia is applied in an automatic, continuous manner consistent with the formation of the tape itself.

A further object is to provide a system of apparatus comprising an element which may be quickly changed to apply one mark or another as the occasion demands.

Still another object is to provide an apparatus whereby the mark may be either applied flush with the tape surface or in raised relation thereto.

Figure 1:
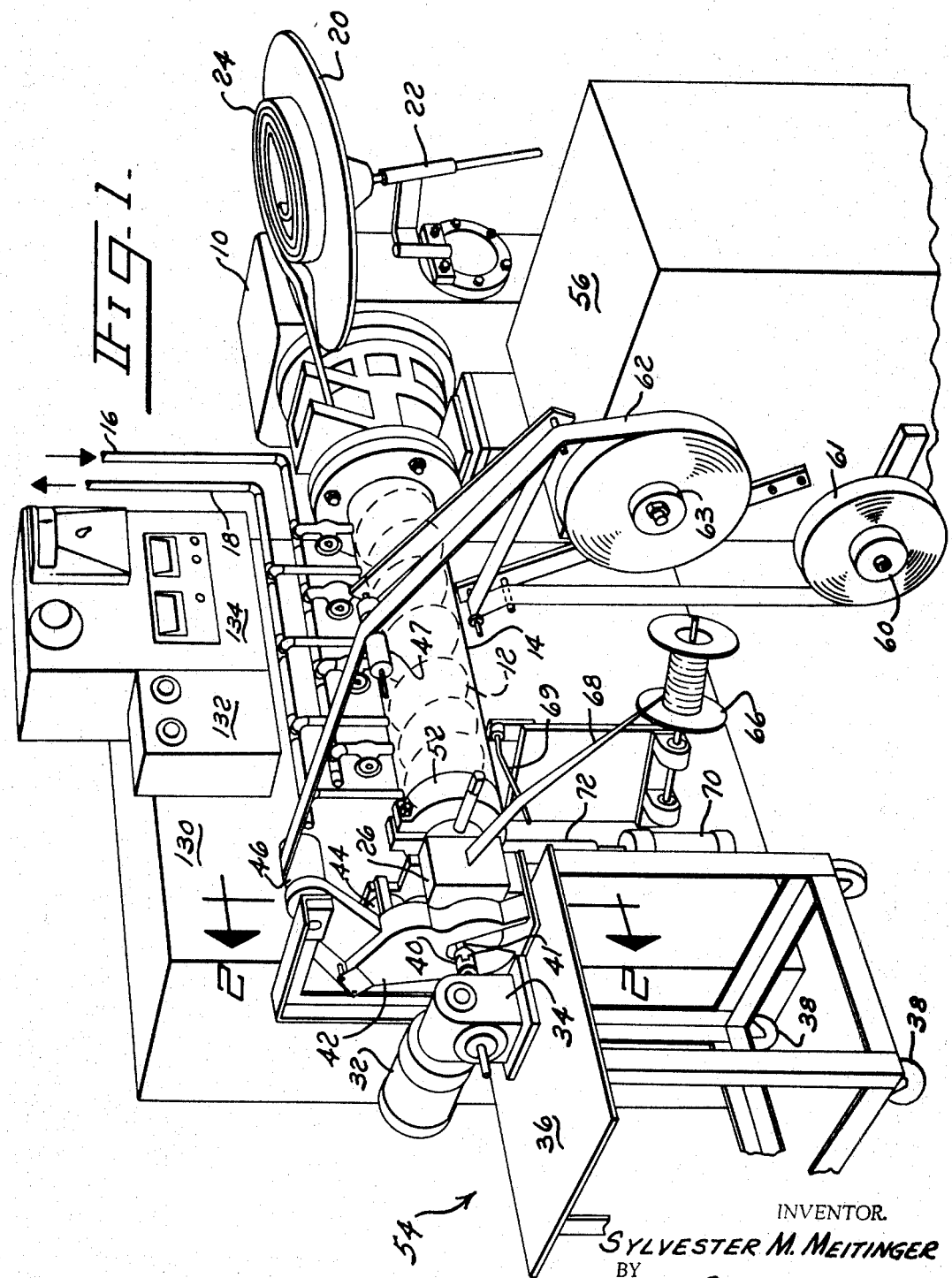
Figure 2:
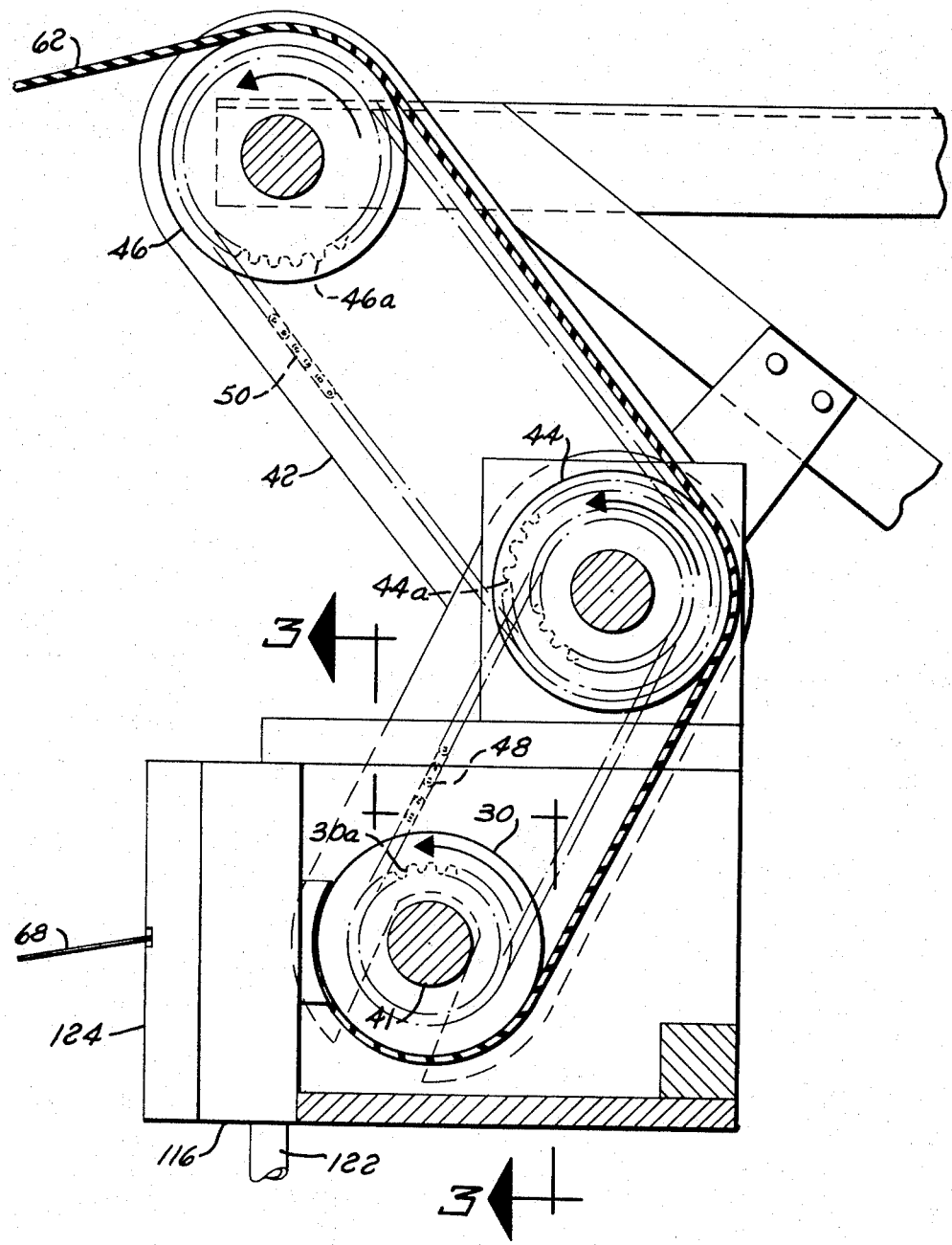
Figure 3:
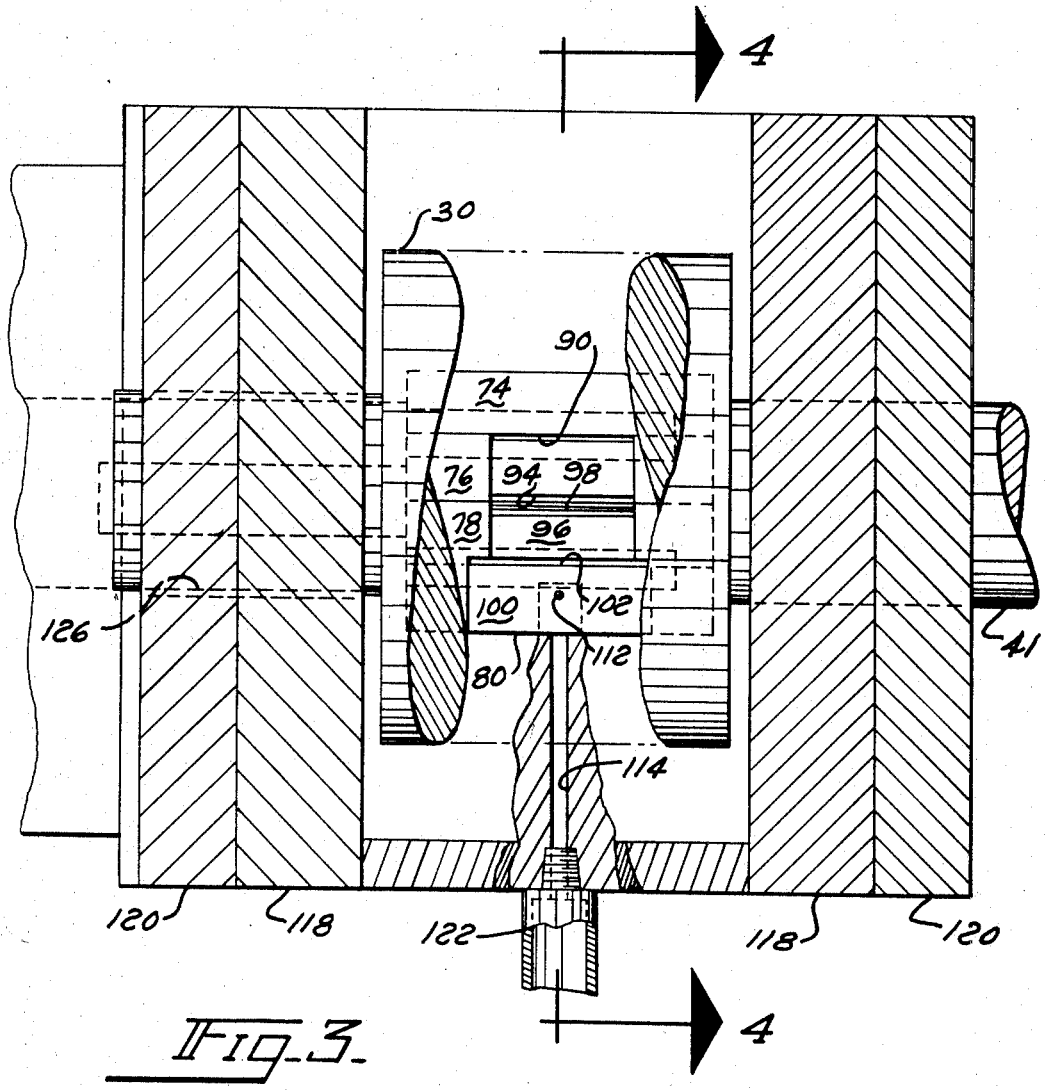
Figure 4:
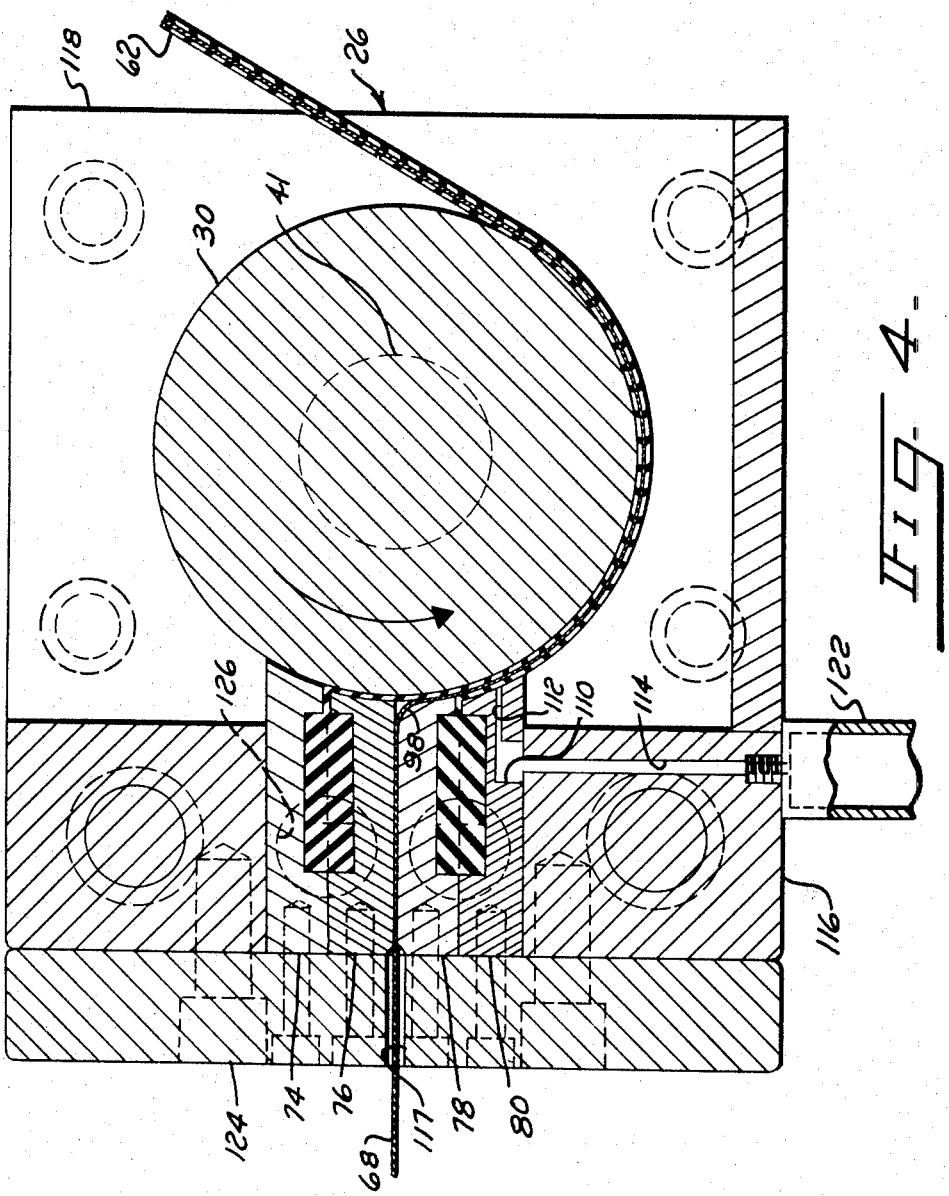
Figure 7:
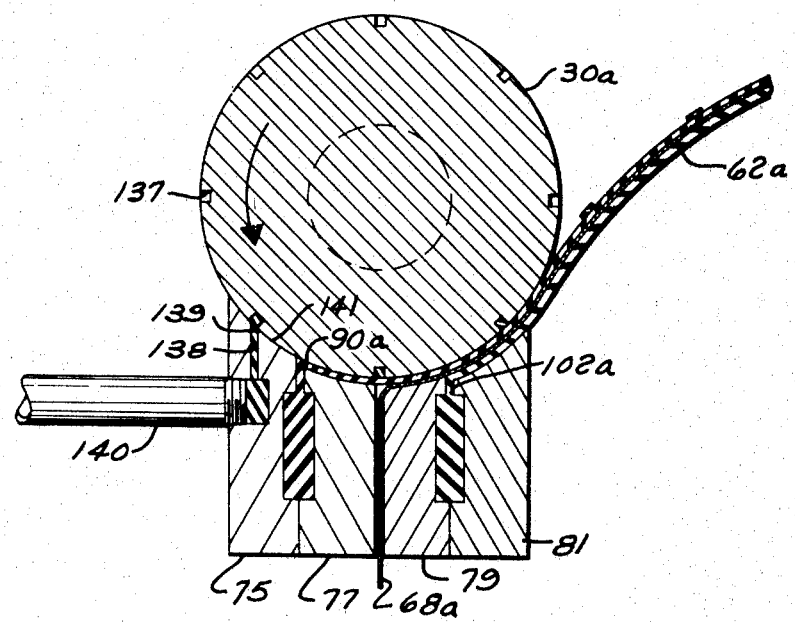
Figure 8:
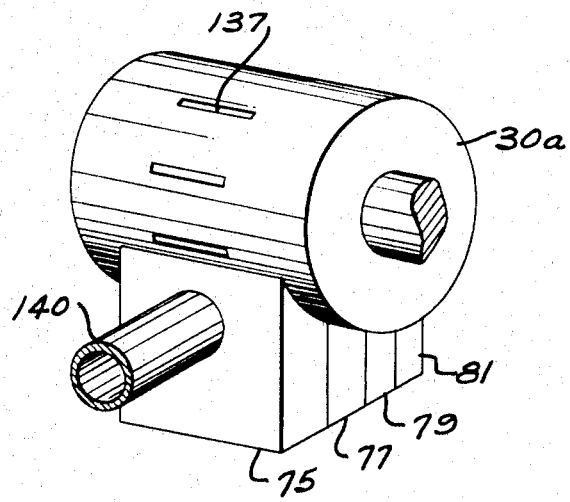

Additional objects and features of the invention will appear more clearly from the following description which is addressed to a preferred form thereof. The description will proceed with reference to the accompanying drawings in which:

FIGURE 1 is an essentially diagrammatic, perspective view showing the principal parts of an apparatus suitable for use in the practice of the invention;
FIGURE 2 is a view on the line 2—2 in FIGURE 1;
FIGURE 3 is taken on the line 3—3 in FIGURE 2;
FIGURE 4 is a view on the line 4—4 in FIGURE 3;
FIGURE 5 is an exploded perspective view illustrating the nature of the extrusion dies employed in the apparatus;
FIGURE 6 is a fragmentary perspective view of a tape product produced according to the invention; and
FIGURES 7 and 8 illustrate a modification.

Generally described, the apparatus, as represented, comprises a system of extrusion dies through which the selected plastic material is forced as by a suitably powered screw conveyor. In the case of the particular apparatus a reinforcing web for the tape is employed, the plastic being applied to the web on both faces thereof, one face being coated through a separately powered transfer member which may, with advantage, take the form of a wheel or disc. Since this apparatus allows for the employment of a plastic, such as silicone rubber, which is self-adherent and contemplates production of the tape in coiled form, means are provided for interposing between the plies of tape a spacing ribbon formed of a material which does not tend to adhere to the plastic.

Referring now to FIGURE 1 illustrating the general organization of the apparatus, the numeral 10 denotes a transmission assembly through which an electric motor, not shown, powers a screw conveyor 12 housed within a jacketed cylinder 14. Conduit 16 allows for the introduction of a heat transfer medium into the jacket portion of the cylinder 14 when necessary or desirable. The heat transfer medium is returned to its source via conduit 18.

A platter 20 turning in journal 22 supported by the housing of the transmission 10 carries the plastic material 24 used in the fabrication of the tape. Such plastic has the form of a coiled strip which unwinds as the screw 12 turns. The rotation of the platter 20 reduces the tension on the strip as it is drawn into the cylinder.

The plastic 24 is forced by the screw 12 into an extrusion die assembly 26 which will subsequently be described in detail. Suffice it to say here, that in the formation of the tape the several dies coact with a transfer wheel 30 (FIG. 4) rearwardly thereof. Such wheel is powered by a motor 32 through reduction gearing 34, the motor and gearing being supported on a table 36 having casters 38. A coupling 40 interconnects the output shaft of the reduction gearing and the shaft 41 which carries the wheel 30.

Upward of the wheel 30 are wheels 44 and 46 (FIG. 2), these being driven by shaft 41 via sprockets 30a, 44a, and 46a and chains 48 and 50. The latter parts are all contained within a housing 42 in which the shafts for the wheels 44 and 46 and the sprockets are journalled.

A coupling 52 (FIG. 1) enables separation of the entire unit 54 from the cylinder 14. Such unit consists of the table 36 and the parts carried thereby viz: motor 32, reduction gearing 34, assembly 26, wheels 30, 40, and 46, housing 42 and the parts therein contained.

Located forward of the cylinder 14, a cabinet 56 rotatably supports a reel 60 of spacer ribbon 61 formed of a material adapted to prevent adjacent plies of the reeled tape product 62 from adhering to one another. Where the tape is manufactured from silicone rubber, Mylar, for example, may be used in the fabrication of the spacer ribbon. Mylar is described chemically as polyethylene terephthalate.

Reel 63 (and indirectly, reel 60) is powered through suitable reduction gearing by an electric motor housed with the gearing in the cabinet 56. The speed at which this motor is operated is determined, of course, by the speed of operation of motor 32.

Situated below the cylinder 14 on a frame-supported mounting is a reel 66 of reinforcing web material 68 which may be fabricated of fiber glass, for instance. This web is drawn into the assembly 26 over a guide rod 69. Below such assembly 26 will be seen a pneumatic cylinder 70 which operates to force plastic contained in the cartridge 72 into the assembly. From FIGURES 3, 4, and 5, assembly 26 will be seen as comprising a plurality of die elements 74, 76, 78, and 80.

Each of the die elements as the same appear in FIGURE 5, has therein a horizontal channel 84 and a vertical channel 86 opening to a groove 88 which is closed at either end. As installed (FIG. 4), the die elements are tightly bunched to the end that the opposed channels 84 and 86 form a passageway and so that the opposed grooves 88 provide a chamber or reservoir to which the passageways open.

Die element 76 (FIG. 5) above the groove 88 therein is recessed (90) to provide a slot opening to the reservoir formed by the registering grooves 88 in die elements 74 and 76. Additionally, the top surface of the die element 76 is recessed (92), the width and depth of the recess being determined by the specifications on the particular tape being fabricated. The recess 92 communicates with a vertical recess 94, the width and depth of which corresponds to the dimensions of the reinforcing fabric being employed.

It should be noted that the top surfaces of the die elements as bunched together form an arc of a circle having a radius corresponding to that of the transfer wheel 30 (see FIG. 4).

A recess 96 formed in the upper surface of the die element 78 is of slightly greater width and depth than the recess 92. Portion 98 of the recess 96 is to be observed as rounded.

Going now to die element 80, this element also will be noted as having a recess 100 formed in the upper curved surface thereof. Such recess is of greater width and slightly greater depth than recess 96 and communicates with a recess 102 which provides an opening to the reservoir formed by the registering of the grooves 88 in the die elements 78 and 80.

Die element 80 will be further noted as channeled to accommodate inverted T members 104, each of which has associated therewith a spring-loaded ball 106. The sharp edges 108 of such members operate to remove excess plastic and set the width dimension of the product tape.

Mediate inverted T members 104 will be observed a short passageway 110 opening to an orifice 112 centered in the recess 100. Passageway 110 communicates with a bore 114 (FIGS. 3 and 4) in the body portion 116 of the assembly 26. Such body portion 116 is fixedly connected to yoke-forming members 118 and is adapted to accommodate a fixture for a line 122 extending from cartridge 72. Members 118 are apertured to allow for passage of the shaft 41 to bearing blocks 120.

A cover 124 is bolted to the body portion 116 and has therein a slot 117 for passage of the fabric web material 68.

In addition to being centrally apertured as required for the accommodation of the bunched die elements 74, 76, 78, and 80, body portion 116 has bores 126 therein allowing for the flow of plastic from cylinder 14 into the two passageways formed by the opposed channels 84 in the die elements.

Reverting to FIGURE 1 of the drawings, there will be seen supported by transformer housing 130 two control boxes 132 and 134. The instruments housed therein being conventional and forming no part of the present invention, detailed description thereof is deemed unnecessary. Suffice it to say, that these instruments allow for automatic control of the speed of motor 32, and hence wheel 30, relative to the pressure in the cylinder 14 which will vary with the stiffness of the plastic being worked, i.e. the stiffer the plastic the higher the pressure. As to the fluid motor 70 which is operated to force plastic from the cartridge 72 into the die block, manual setting of the pressure therein is contemplated. This pressure value is determined by the stiffness of the plastic and the speed of rotation of wheel 30.

*Operation*

To describe now the operation of the apparatus, the plastic material 24 drawn from the platter 20 into the cylinder 14 is forced by the screw 12 through the opening 126 in the body portion 116 of assembly 26. From such opening, the plastic flows through the passageways formed by the opposed channels 84 and 86 in the die elements 74, 76, 78, and 80 (FIG. 5) into the reservoirs provided by the opposed grooves 88 in these elements. The plastic forced through the slot provided by recess 90 coats the periphery of wheel 30 which (FIG. 4) rotates counterclockwise. This plastic is immediately applied to one face of the fabric web 68 which is accommodated as it travels toward wheel 30 in recess 94 in die element 76. Tearing of the web is precluded by rounded portion 98 of recess 96 in die element 78.

As the wheel 30 continues to rotate counter-clockwise plastic forced through recess 102 in element 80 is deposited on the outer face of web 68. Immediately thereafter there is centrally deposited on this last coat a thin line of plastic derived from cartridge 72 via conduit 122, bore 114 in body portion 116, passage 110 in die element 80 and orifice 112 in such element. It is contemplated, as indicated hereinbefore, that the color of the plastic emitting from orifice 112 will contrast with the color of the substrate coating. It is further contemplated that the line so deposited will be employed to facilitate wrapping of the tape product about itself when the tape is applied as a cable sheathing, for instance.

By using a plurality of orifices 112 and associated passages a tape may be produced displaying a plurality of lines or bands, as for purely ornamental effect. These may be of different colors, if a corresponding number of cartridges 72 are employed.

On further rotation of wheel 30, the fabric reinforced tape, with the guide line 135 (FIG. 6) embedded therein so that the upper surface of the guide line is flush with the body of the tape, passes around wheels 44 and 46, thence over idler roller 47, not hereinbefore identified, to reel 63. The spacer ribbon 61 which is introduced between the plies of tape in the manner illustrated serves as previously explained to prevent adherence of the tape to itself.

Once the tape 62 on the reel 63 has built up to a predetermined diameter the tape is cut and the coil of tape removed for storage and subsequent curing. Immediately on removal of the coil, the free end of the tape extending from the machine is secured to the hub of the reel to start a new coil.

Taking up now the modifications to which FIGURES 7 and 8 are addressed, here the wheel 30a which corresponds to wheel 30 is peripherally engraved, the engravings for sake of simplicity being shown simply as grooves (137).

Die elements 75, 77, 79, and 81 conform respectively to die elements 74, 76, 79, and 81 (FIG. 5) except for the omission from die element 81 of the passageway 110 and the orifice 112 and except for the inclusion in die element 75 of a slot 138. The latter communicates with a conduit 140 (FIG. 8) through which plastic is introduced to fill the grooves or engravings 137 as the wheel 30a rotates counter-clockwise as indicated.

In operation of the modified system, plastic introduced through the conduit 140 is picked up by the rotating wheel in the grooves 137 therein and carried to the opening 90a where the plastic in the grooves becomes covered with plastic emitting from such opening. The wiper edge 139 and the lack of any gap at 141 between the wheel and the curved upper surface of die element 75 prevents coating of the wheel extraneously of the grooves 137.

As the wheel 38 continues to rotate, the fabric webbing 68a becomes coated with the plastic supplied to the wheel at 30a. Subsequently the opposite side of the web 68a becomes coated with plastic emitting from opening 102a.

Since the plastic introduced into the grooves 137 in the wheel 30a adheres to the plastic coating first applied to the web 68a, the tape product 62a as it leaves the wheel 30a has thereon a raised design conforming with the grooves in the wheel.

It is to be understood that the wheel 30a may be variously engraved. Thus script lettering, which could conform with the name of the manufacturer of the tape, for instance, can be used.

The material 68 and 68a serving to reinforce the tape has been referred to herein as a web material. It is not meant by such term to imply that the material must be woven, for when reinforcement is required, which is not always the case, the invention may be practiced using materials in strand form, for instance, including metallic strands, particularly when formed of metals capable of efficiently conducting an electric current.

The invention, of course, assumes the employment of a transfer member, e.g. wheel 30 or 30a, possessing a highly polished non-porous peripheral surface having less adhesive affinity for the plastic being processed than the plastic has for itself.

The invention claimed is:

1. A system for fabricating a plastic product comprising a reinforcing component, said system utilizing means for passing such component together with two streams of plastic through separate openings in the path of an endless transfer member having a recess therein, the opening for said component being located between the other two openings, said streams being applied to opposite portions of said component to coat the same, application of one of said streams being effected through said transfer member, said system further including means having an opening for application of material from a third stream of plastic over a limited area of the coating supplied by the said one of said streams, the opening for the said third stream being located in the path of said member ahead of the opening for the said one of said streams, said system being characterized in operation in that the plastic of said third stream enters the recess in said member and is deposited from said recess on the coating supplied by the said one of said streams.

2. A system according to claim 1 where the transfer member has the form of a wheel with the recess being in the periphery thereof and where the said reinforcing component is web-like in form.

References Cited

UNITED STATES PATENTS

| | | | |
|---|---|---|---|
| 2,897,540 | 8/1959 | Rhodes | 18—12 |
| 2,944,285 | 7/1960 | Rhodes | 18—12 |
| 2,955,970 | 10/1960 | Rice et al. | 156—244 |
| 3,159,516 | 12/1964 | Harris | 156—244 X |

FOREIGN PATENTS 245,823  10/1960  Australia.

WALTER A. SCHEEL, *Primary Examiner.*

R. I. SMITH, *Assistant Examiner.*

U.S. Cl. X.R.

18—12; 118—206